(12) United States Patent
Tseng

(10) Patent No.: US 7,309,932 B2
(45) Date of Patent: Dec. 18, 2007

(54) VOICE COIL MOTOR APPARATUS FOR POSITIONING

(75) Inventor: Yu-Kuang Tseng, Taipei (TW)

(73) Assignee: Vasstek International Corporation, Hsinchu (TW)

( * ) Notice: Subject to any disclaimer, the term of this patent is extended or adjusted under 35 U.S.C. 154(b) by 324 days.

(21) Appl. No.: 10/986,189

(22) Filed: Nov. 12, 2004

(65) Prior Publication Data

US 2006/0055252 A1    Mar. 16, 2006

(30) Foreign Application Priority Data

Sep. 16, 2004   (TW) ............................. 93127967 A

(51) Int. Cl.
*H02K 41/00* (2006.01)
(52) U.S. Cl. .......................................... 310/12; 310/15
(58) Field of Classification Search ................. 310/12, 310/14, 15
See application file for complete search history.

(56) References Cited

U.S. PATENT DOCUMENTS

| | | | |
|---|---|---|---|
| 5,978,600 A | * 11/1999 | Takeuchi et al. | .............. 396/53 |
| 6,006,041 A | * 12/1999 | Mizumaki et al. | .......... 396/296 |
| 6,747,631 B1 | * 6/2004 | Sakamaki et al. | .......... 345/157 |
| 6,901,677 B2 | * 6/2005 | Smith et al. | ................... 33/551 |
| 2004/0118927 A1 | * 6/2004 | Breytman et al. | ..... 235/462.37 |

* cited by examiner

Primary Examiner—Dang Le
(74) Attorney, Agent, or Firm—Rabin & Berdo, P.C.

(57) ABSTRACT

A voice coil motor apparatus for positioning is disclosed. The voice coil motor is used by the auto-focus lens control module of a miniature camera. The apparatus contains a voice coil motor, a position feedback sensor, and a positioning controller. The voice coil of the voice coil motor can be either movable or stationary, where in the former case the attached power cable is a flexible circuit board, and in the latter case the power cable is fixed. The position feedback sensor includes a photo interrupter, a light reflector, and a bias circuit used for tracking any displacement of the movable part of the motor. The positioning controller uses the voltage signals to be processed through a proportional-integral-differential computation unit to manipulate an output current for accurate positioning of the movable part of the motor within a prescribed range.

7 Claims, 5 Drawing Sheets

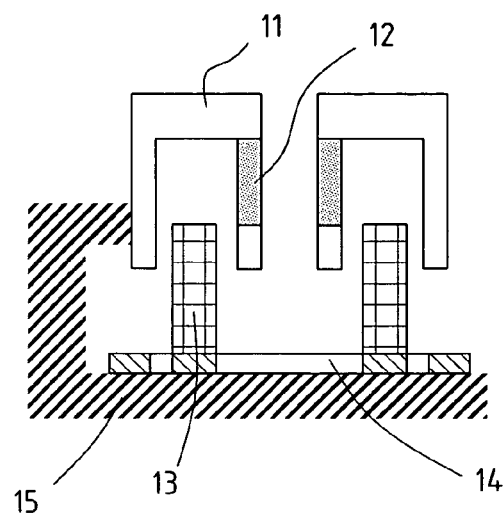
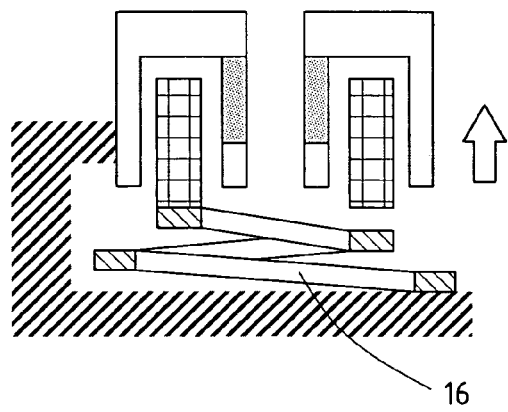
FIG. 1a  FIG. 1b
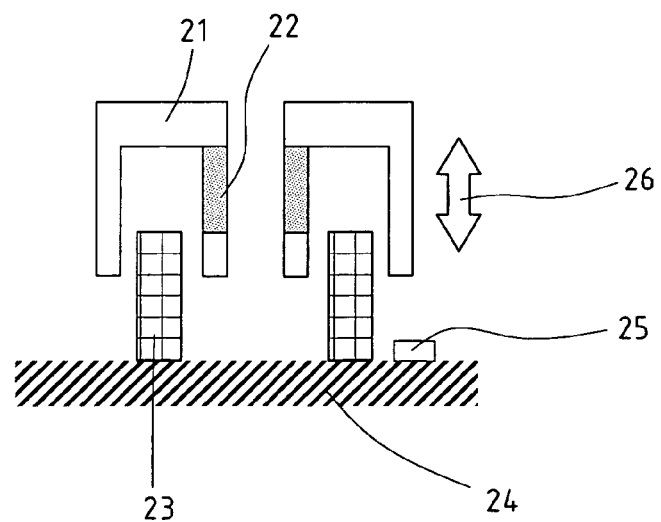
FIG. 2

VOICE COIL MOTOR APPARATUS FOR POSITIONING

BACKGROUND OF THE INVENTION

1. Field of the Invention

The present invention relates to a voice coil motor (VCM) apparatus for positioning, and in particular to an apparatus for positioning the movable lens of an auto-focus module used in a miniature camera.

2. The Related Art

A conventional voice coil motor includes a movable part and a stationary part as shown in FIG. 9. The stationary part, fixed on the substrate 92, is composed of a permanent magnet 911 and an iron yoke 912 to produce a magnetic field through the air gap 913 of the magnetic circuit. The movable part is composed of a coil winding 931 and a power cable 932 with one end being connected to the coil winding 931. When a current is supplied to the coil winding 931, the coil winding will move through the air gap as a result of the interaction between the current and the magnetic field.

As the coil winding 931 is the movable part of the voice coil motor, a flexible power cable 932, with one end connected to the coil winding 931 and the other connected to a power source on the substrate 92, should be used in order to draw in the necessary electricity during the motion of the motor. Conventional voice coil motors often employ a flexible U-shaped power cable. For a low-power voice coil motor, the power cable can be implemented with a flexible printed circuit board. Generally, the use of a U-shaped flexible printed circuit board requires a sufficiently large curvature radius, if the flexible printed circuit board is continuously twisted and able to last for a normal service life as expected. Most compact electronic devices simply do not have enough internal space to accommodate such requirements, and it is also against current efforts of downsizing components.

In addition, a positioning apparatus also needs a position detector 94 to measure the displacement of the movable part of the voice coil motor and a positioning controller 95 to adjust the coil current, so that the relative displacement between the movable part and the stationary part can be controlled.

Conventional voice coil motors have the following disadvantages when applied to the positioning of the lens for the auto-focus module of a miniature camera: (1) Conventional voice coil motors often employ non-contact position sensors such as linear scale, fiber-optic displacement detector, or laser displacement detector to feed back the displacement information of the movable part. However, for the application of a miniature camera, the sever limitation on the cost and the space will make the usage of the aforementioned position sensors almost impossible. (2) The flexible U-shaped power cable adopted in the voice coil motor needs sufficiently large space to maintain its life cycle under continuous twisting, which in turn will be against efforts to downsize components in a miniature camera. (3) Also, the additional force induced by the elasticity of the flexible power cable is another factor to be considered. The voice coil motor needs to draw more current to counter this force. This therefore results in considerable power consumption, which is a negative effect for the application of the voice coil motor in a battery-powered camera.

Therefore, developing a low-cost and small position feedback sensor and minimizing the negative effects due to the flexible power cable are some of the issues to be dealt with, if a voice coil motor is to be used in the positioning of the movable lens of miniature cameras.

SUMMARY OF THE INVENTION

The primary objective of the present invention is to provide a voice coil motor apparatus for positioning that can achieve precision positioning within a prescribed range.

The secondary objective of the invention is to provide a positioning apparatus that is small enough to be built into a miniature camera for positioning the movable lens of an auto-focus module.

The structure of a voice coil motor apparatus for positioning, in accordance with the present invention, includes a voice coil motor that generates a motion force to drive the load; a position feedback sensor that tracks the displacement of the movable part of the voice coil motor; and a positioning controller that receives voltage signals representing the displacement, and performs mathematical operations so as to manipulate a motion force for positioning the movable part within a prescribed range.

The position feedback sensor used by the voice coil motor apparatus, in accordance with the present invention, makes use of a photo interrupter, a specially designed bias circuit, and a light reflector, in order to continuously track the displacement of the movable part of the voice coil motor.

In accordance with the present invention, the voice coil motor contains a magnetic circuit, which is formed by at least one permanent magnet and at least one iron yoke to produce a steady magnetic field through the air gap of the magnetic circuit.

In accordance with the present invention, the voice coil motor contains an electrical circuit, which is formed by a coil winding suspended in the above magnetic field and a power cable to provide the necessary exciting current to the coil winding so as to produce a motion force on the coil winding.

In accordance with the present invention, the voice coil motor may be constructed with the magnetic circuit as stationary and the electrical circuit as movable. In such a scheme, the power cable is made of a flexible printed circuit board with a flat-coiled pattern, which can minimize the space for continuous twisting and the additional force due to elasticity.

In accordance with the present invention, the voice coil motor may also be constructed with the magnetic circuit as movable, and the electrical circuit as stationary. In such an arrangement, the power cable is fixed irrespective of the motion of the movable part. The previous considerations of space clearance and the elasticity effect due to the flexible power cable, therefore, are cleared out of the way in the present design.

In accordance with the present invention, the position feedback sensor used to track the displacement of the movable part of the voice coil motor employs a miniature, low-cost photo interrupter, which is formed by a light emitting diode to transmit light signals and a phototransistor to receive reflected light signals.

In accordance with the present invention, the position feedback sensor further includes a light reflector that has a reflective surface with either pure white color or white/black color combination for reflecting light signals depending on the relative motion direction of the light reflector and the photo interrupter. The light intensity of the reflected light signal will be linearly changed according to the relative position of the photo interrupter and the light reflector, so that the displacement of the movable part of the voice coil motor can be measured.

In accordance with the present invention, the position feedback sensor further includes a bias circuit, which is formed by an op amp and a resistor, where the positive terminal of the op amp is connected to a steady voltage source, so that the bias voltage across the collector and the emitter of the phototransistor is stabilized, and the negative terminal of the op amp is connected to the collector of the phototransistor and also to one end of a resistor, and the output terminal of the op amp is connected to another end of the resistor, so that reflected light signals are converted to corresponding voltage signals.

In accordance with the present invention, the positioning controller is to receive voltage signals from the bias circuit representing the position feedback value, which is subtracted by a reference position signal to produce a position-error signal, which is then processed through a proportional-integral-differential control algorithm to adjust the coil current, so that the position-error signal can be decreased down to zero. Therefore, the relative position between the magnetic circuit and the electrical circuit of the voice coil motor can be well controlled within a prescribed range.

The present invention will become more obvious from the following description when taken in connection with the accompanying drawings, which show, for purposes of illustration only, a preferred embodiment in accordance with the present invention.

BRIEF DESCRIPTION OF THE DRAWINGS

FIG. 1A is a sectional view of a voice coil motor with power cable and moving coil in accordance with the present invention;

FIG. 1B is similar to FIG. 1A, but showing a fully extended moving coil of the voice coil motor in accordance with the present invention;

FIG. 2 is a sectional view of a voice coil motor with fixed power cable and coil core in accordance with the present invention;

DETAILED DESCRIPTION OF THE PREFERRED EMBODIMENT

Figure 3:
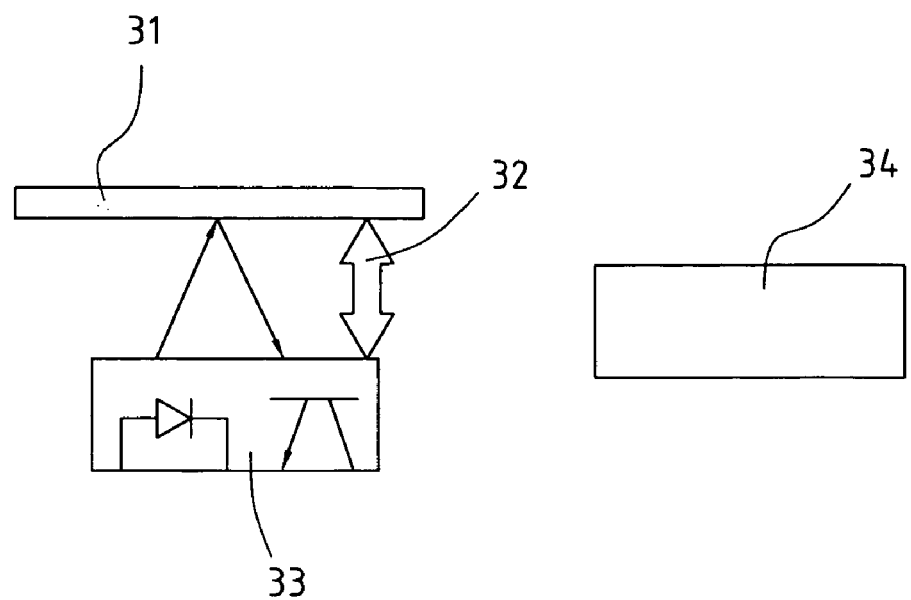
FIG. 3 shows a vertical motion of the light reflector relative to the photo interrupter and the pure white color pattern on its reflective surface.

Referring to FIGS. 1A and 1B, the presently described voice coil motor includes a movable part and a stationary part. Preferably, the electrical circuit of the voice coil motor is movable, being composed of a coil winding 13 and a flexible circuit board as the power cable 14, and the magnetic circuit is stationary, being composed of an iron yoke 11 and a permanent magnet 12, fixed on a substrate 15. When the motor is first started, the coil winding 13 remains at one end, and the flexible power cable is coiled as a flat pack, but when the coil winding 13 is supplied with exciting current, the coil winding 13 moves to another end as shown in FIG. 1B. Since one end of the power cable 14 is connected to the coil winding 13, when the coil winding 13 moves to another end, the coiled power cable is stretched out in a spring-up posture 16 as shown in FIG. 1B.

When the above-mentioned voice coil motor with short stroke is used in auto-focus lens control module of a miniature camera, the motion of the flexible power cable 14 can be manipulated within a prescribed range, i.e. the displacement of the movable part, so that the power cable is usable within a regular service life. In addition, the use of the above-mentioned voice coil motor is able to eliminate the additional force induced by elasticity of the flexible power cable.

If the power requirement for the voice coil motor power has to be decreased, and the space in the miniature camera does not allow for extra clearance of the power cable, it is preferable to use a type of voice coil motor as shown in FIG. 2. The movable part is formed by an armature 21 and a permanent magnet 22, and the stationary part is formed by a coil core 23 and a fixed power cable 25. Since the power cable 23 is fixed, when a magnetic force is produced, the movable part moves in the vertical direction 26. With such motor design, the above-mentioned voice coil motor can be freed from the space constraint and the negative effects of elasticity induced by conventional voice coil motors.

The structure of a voice coil motor controlled positioning apparatus, in accordance with the present invention, includes a voice coil motor that generates a motion force to drive the load; a position feedback sensor that tracks the relative displacement of the movable part in a stroke; and a positioning controller that receives voltage signals representing the position feedback value, and performs mathematical operations to adjust the coil current, so that the position-error signal can be reduced down to zero. The displacement of the movable part of the movable part can be controlled within a prescribed range.

Figure 4:
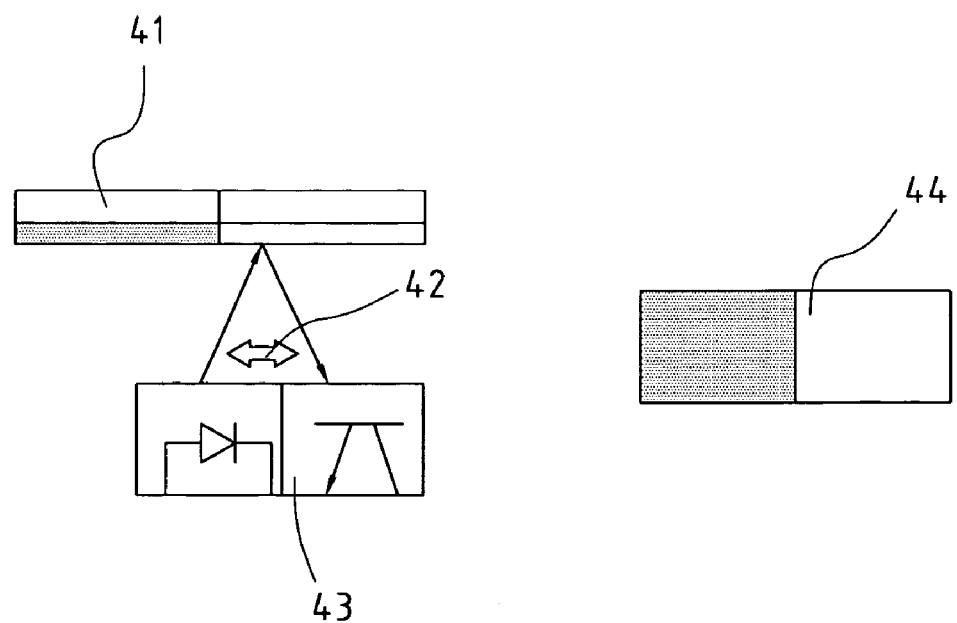
FIG. 4 shows a horizontal motion light reflector relative to the photo interrupter and the black/white alternate color combination on its reflective surface.

In accordance with the present invention, a switch-operated photo interrupter 33/43 and a light reflector 31/41, as shown in FIGS. 3 and 4, are employed in the position feedback sensor, where the photo interrupter uses a light emitting diode to transmit light beams and a phototransistor to receive reflected light signals. The light reflector is used to record the relative displacement of the movable part during the execution of a stroke. There are two ways to measure the relative displacement between the stationary part and the movable part of the motor.

Using the first method to calculate the relative displacement between the stationary part and the movable part of the voice coil motor, a light reflector 34 with pure white color on the reflective surface as shown in FIG. 3 is used. When the direction of motion 32 of the light reflector 31 and the light reception angle of the photo interrupter 33 are parallel to each other, both in the vertical direction, it is sufficient to use the light reflector 31 with pure white color. It shall be noted that a stabilized bias voltage is required across the collector and emitter of the phototransistor, whereby the collector current decreases along with the relative displacement between the mid-point of the photo interrupter 33 and the light reflector 31 according to a logarithmic scale.

Using the second method to calculate the relative displacement between the stationary part and the movable part of the voice coil motor, a light reflector 44 with a black/white color combination on the reflective surface as shown by FIG. 4 is required. When the direction of motion of the light reflector 41 and the light reception angle of the photo interrupter 43 are perpendicular to each other, it is necessary at this time to use light reflector 41 with a black/white alternate color combination. It shall be noted that a stabilized bias voltage is required across the collector and emitter of the phototransistor, whereby the collector current decreases along with the relative distance between the mid-point of the photo interrupter 43 and the color separation line on the reflective surface of the light reflector 41 according to a linear scale.

Figure 5:
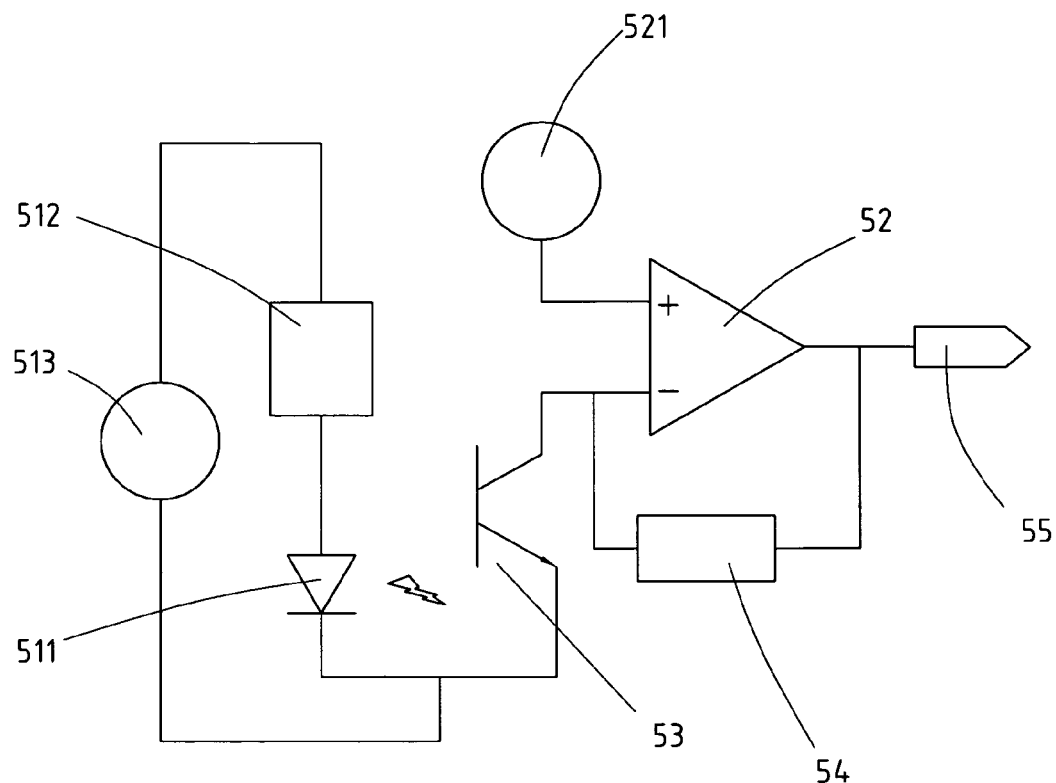
FIG. 5 is a schematic view of the position feedback sensor showing a photo interrupter and a bias circuit.

From the foregoing, it shall be noted that to use the photo interrupter to measure the relative displacement between the movable part and the stationary part of a voice coil motor, it is necessary to have the bias voltage across the collector and emitter of the phototransistor stabilized in order to obtain reliable voltage measurements. To this end, a specially designed bias circuit using an op amp is installed. As shown in FIG. 5, the light emitting diode 511 of the photo interrupter is connected to a first voltage source 513 through a resistor 512 to emit light beams, and the bias circuit includes an op amp 52, whose positive terminal is connected to a second voltage source 521, and the negative terminal of the op amp 52 is connected to the collector of the phototransistor 53, and is also connected to the output of the op amp 52 through a resistor 54. As the op amp 52 is virtually shorted, the potential across the collector end of the phototransistor 53 is made equivalent to the potential across the second voltage source 521 that is connected to the positive terminal of the op amp 52, thus the bias voltage across the collector and emitter is stabilized.

At this time, a reflected light signal is received by the collector of the phototransistor 53 to produce a collector current, and is then convert to voltage signals 55 as the negative terminal of the op amp 52 and the output of the op amp 52 is connected by a resistor 54. The voltage signal is a regulated output, and the high gain output of the op amp 52 can be used to reduce the loading in the next stage circuit.

Figure 6:
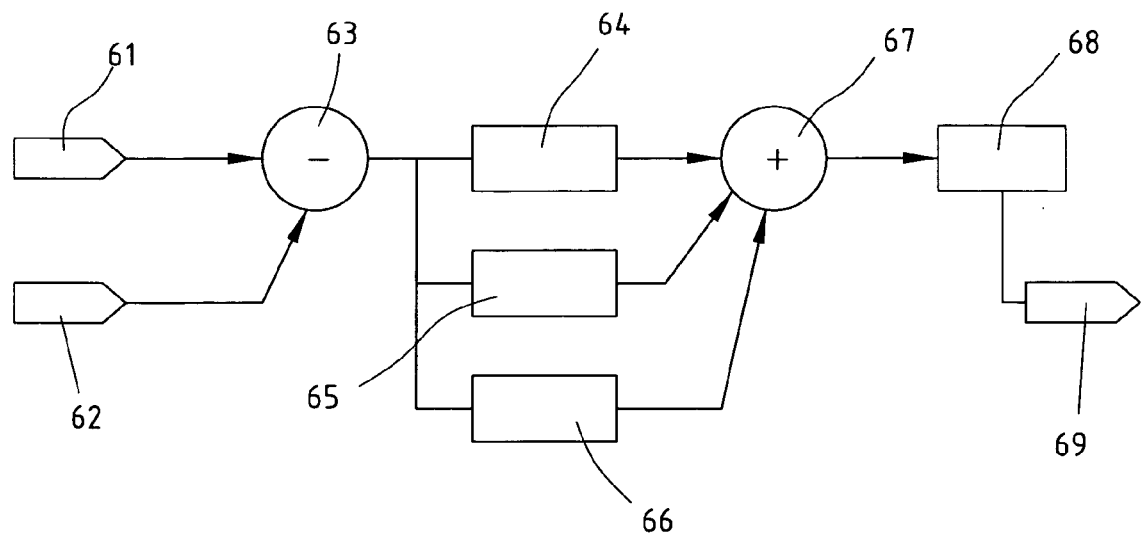
FIG. 6 is a schematic view of the positioning system in accordance with the present invention.

The positioning controller as shown in FIG. 6 is used to receive voltage signal 61 from the bias circuit representing the position feedback value, and the received position feedback signal is then subtracted by a reference position signal 62 through a subtractor 63 to produce a position-error signal. The position-error signal is then simultaneously processed by a proportional-integral-differential computation unit containing a proportional control 64, an integrator 65, and a differentiator 66 to produce three output signals simultaneously. These three signals are then summed by an adder 67 to manipulate an output current for a power amplifier 68, so that the position-error signal is eventually reduced down to zero to produce an output current that enables precision positioning of the movable part within a prescribed range. The functions of the proportional control 64, the integrator 65, and the differentiator 66 have been amply described in previous literatures, so the operating principles of the proportional-integral-differential computation unit will not be reiterated in here.

From the foregoing, the positioning apparatus disclosed in the present invention that adopts a voice coil motor has several advantages over prior art techniques:

(1) Using the coil as the movable part of the motor, together with a flexible circuit board enables the present invention to work with the space constraint and the elasticity effect in harmony.

(2) Using the coil as the stationary part of the motor and a fixed power cable enables the motor design to be set free from the previously encountered space constraint and the elasticity effect.

(3) Using a low-cost photo interrupter in the position feedback sensor, together with a bias circuit and a light reflector enables the present invention to closely check the relative displace of the movable part of the voice coil in a stroke, so as to manipulate a motion force necessary for precision positioning of the movable part within a prescribed range, thus making the positioning apparatus suitable for use in a miniature camera.

Figure 7:
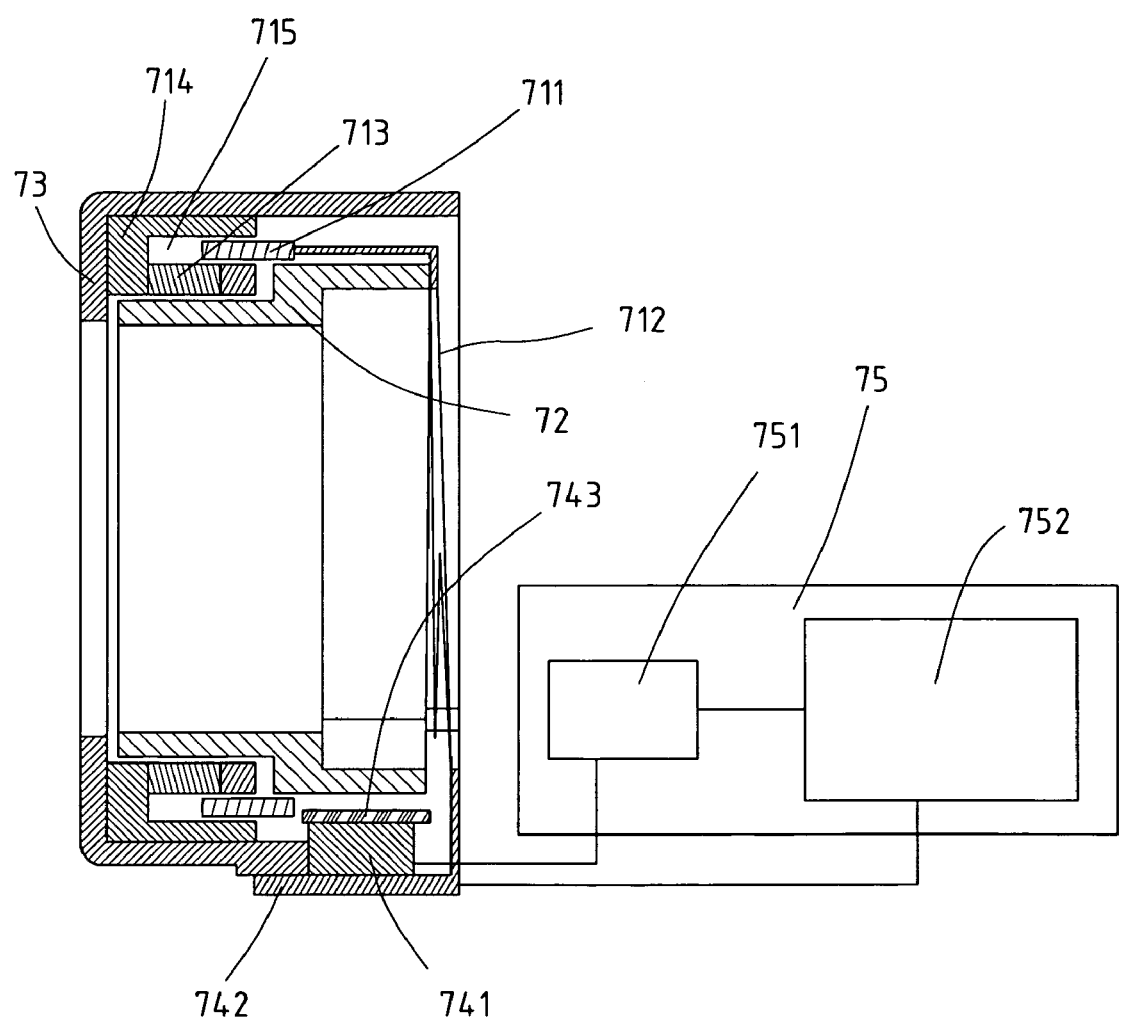
FIG. 7 shows one preferred embodiment using a movable-coil voice coil motor in the auto-focus lens control module of a miniature camera.

There can be two different ways to implement the voice coil motor controlled positioning apparatus in the auto-focus lens control module of a miniature camera:

In the first scheme, the coil winding of the motor is a movable part in the voice coil motor. The structure of the positioning apparatus preferably includes a movable lens adjustment frame, a voice coil motor, a position feedback sensor, a positioning controller, and an outer shell. As shown in FIG. 7, the voice coil motor includes an electrical circuit composed of a coil winding 711 attached on one side of the movable lens adjustment frame 72, and connected to a flexible power cable 712 coiled as a flat pack on the other side of the movable lens adjustment frame 72. The voice coil motor also includes a magnetic circuit composed of a permanent magnet 713 and an iron core 714, together forming a ring inside the outer shell 73, so that the movable coil 711 is suspended in the air gap 715 of the magnetic circuit. The position feedback sensor includes a photo interrupter 741 being fixed on a circuit board 742 that is embedded at the bottom of the module; a light reflector 743 being fixed on the movable lens adjustment frame 72 facing the photo interrupter 741; and a bias circuit 751 being installed in a separate control circuit module 75 together with the positioning controller 752 which can be either formed by discrete components or an integrated circuit.

Figure 8:
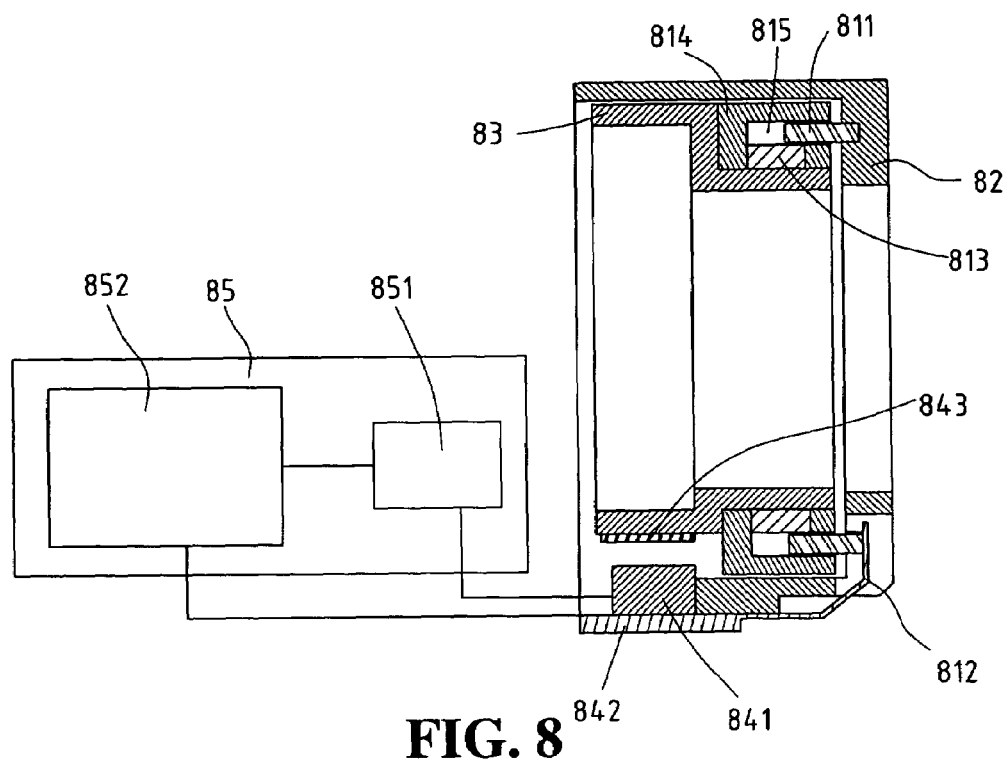
FIG. 8 shows another preferred embodiment using a fixed-coil voice coil motor in the auto-focus lens control module of a miniature camera.
Figure 9:
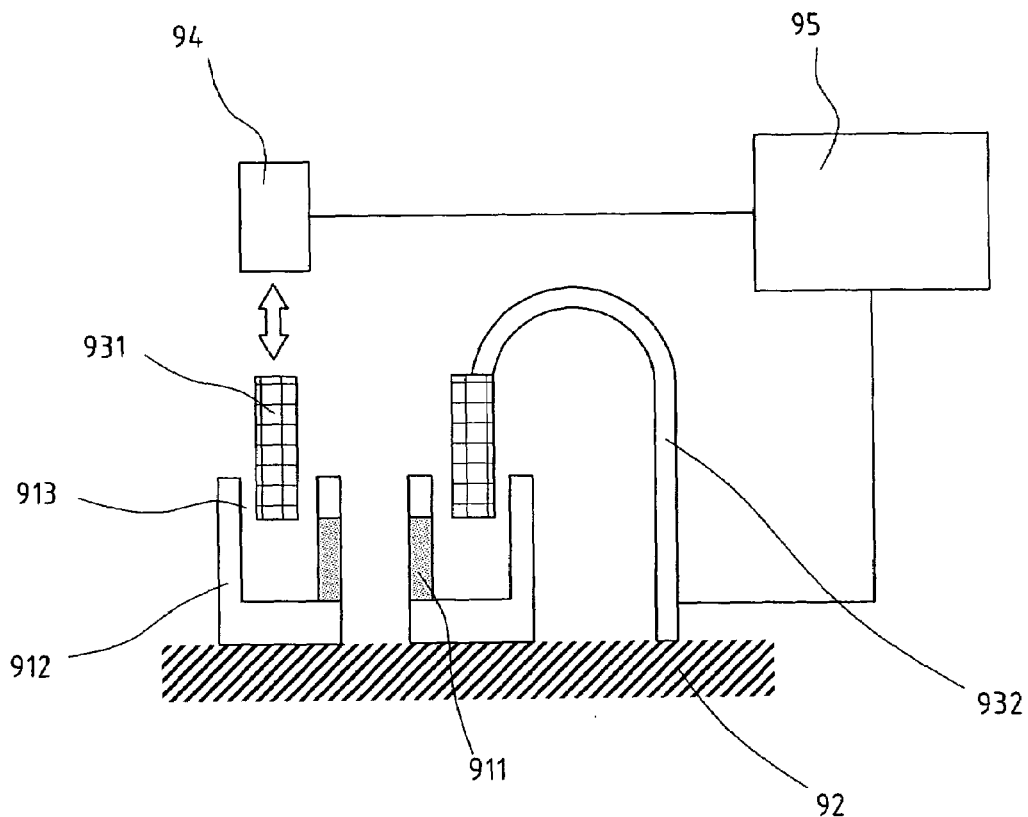
FIG. 9 shows the structure of a conventional voice coil motor.

If the coil of the voice coil motor is a stationary part of the motor, the structure of the voice coil motor controlled positioning apparatus preferably includes a movable lens adjustment frame, a voice coil motor, a position feedback sensor, a positioning controller, and also an outer shell. As shown in FIG. 8, the voice coil motor includes a coil core 811 in the form of a ring inside the shell 82 and connected to a fixed power cable 812. The voice coil motor includes a magnetic circuit composed of a permanent magnet 813 and an armature 814 being fixed on the movable lens adjustment frame 83, so that the coil core 811 is suspended in the air gap of the magnetic circuit 815. The position feedback sensor includes a photo interrupter 841 being fixed on a circuit board 842 that is embedded at the bottom of the module; a light reflector 843 being fixed on the movable lens adjustment frame 83 facing the photo interrupter 841; and a bias circuit 851 being fixed in a separate control circuit module 85 outside the shell 82, together with a positioning controller 852 which can be formed by discrete components or an integrated circuit.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A voice coil motor apparatus for positioning, comprising:
 a voice coil motor to generate a motion force to drive a load;
 a position feedback sensor to measure relative displacement of a movable part of the voice coil motor, the position feedback sensor including:
  a photo interrupter that uses a light emitting diode to transmit light signals, and a phototransistor to receive reflected light signals;
  a light reflector that is installed with a reflective surface facing the photo interrupter, so that displacement of the movable part of the motor results in changes of light intensity of the reflected light signals; and
  a bias circuit that receives the reflected light signals from the photo interrupter and converts the light signals to voltage signals accordingly; and
 a positioning controller that uses the voltage signals representing the displacement to perform mathematical operations, so that a motion force on the movable part can be manipulated to achieve positioning;
 wherein the bias circuit comprises: an op amp having a positive terminal and a negative terminal, the positive terminal being connected to a steady voltage source and the negative terminal being connected to a collector of the phototransistor; and a resistor in which one end is connected to the negative terminal of the op amp, and another end is connected to an output of the op amp, so that a collector current is converted to the voltage signals.

2. The voice coil motor apparatus for positioning as claimed in claim 1, wherein the voice coil motor includes:
 a magnetic circuit that is composed of at least one permanent magnet and at least one iron yoke to generate a magnetic field through an air gap in the magnetic circuit; and
 an electrical circuit that is composed of at least one coil winding suspended in the air gap and connected to a power cable for supplying a current, so that the motion force can be generated due to the interaction between a coil current and the magnetic field.

3. The voice coil motor apparatus for positioning as claimed in claim 2, wherein the voice coil motor is constructed with the magnetic circuit as stationary and the electrical circuit as movable, where a flexible circuit board is used as the power cable that is connected to the coil winding, such that the power cable is fully stretched out at the end of a stroke, but coiled as a flat pack at the beginning of the stroke.

4. The voice coil motor apparatus for positioning as claimed in claim 2, wherein the voice coil motor is constructed with the magnetic circuit as movable and the electrical circuit as stationary, thereby the power cable is fixed.

5. The voice coil motor apparatus for positioning as claimed in claim 1, wherein the light reflector uses the reflective surface with pure white color when a direction of motion of the light reflector and a light reception angle of the photo interrupter are parallel to each other.

6. The voice coil motor apparatus for positioning as claimed in claim 1, wherein the light reflector uses the reflective surface with black/white color combination when a direction of motion of the light reflector and a light reception angle of the photo interrupter are perpendicular to each other.

7. The voice coil motor apparatus for positioning as claimed in claim 1, wherein the positioning controller is to receive the voltage signal from the bias circuit, representing a position-feedback signal, which is then subtracted by a position-reference signal to produce a position-error signal, which is then processed by a proportional-integral-differential control algorithm to adjust an output current through a power amplifier, so that the position-error signal can be decreased down to zero.

* * * * *